Patented May 6, 1947

UNITED STATES PATENT OFFICE 2,420,134

COATING COMPOSITION COMPRISING PHENOL-FORMALDEHYDE RESIN IN A MIXTURE OF SOLVENTS

Charles H. Hempel and Francis J. Ploederl, Manitowoc, Wis., assignors to Heresite & Chemical Company, a corporation of Wisconsin No Drawing. Application October 18, 1943, Serial No. 506,727

2 Claims. (Cl. 260—30)

This invention relates to a solvent for coating interior surfaces of vessels with corrosion resistant resins, and to the resin-solvent composition.

The invention is particularly applicable to phenol formaldehyde resinous coatings and especially those which are described in Hempel Patents 2,198,939 and 2,253,235.

As described in those patents, a clear phenol formaldehyde resin is employed, free from oil, but containing from 10% to 45% of an inert filler, and preferably from 25% to 35% of such filler. Suitable fillers are ochre, sienna, cinnabar, barium sulfate, lithopone, zinc oxide, umber, titanium dioxide, and kaolin.

The present invention describes a solvent for a resin of this type which may be applied under extraordinary conditions, particularly where evaporation is limited, as, for example, on the interior of a torpedo air flask. Such a flask will weigh from 600 to 1,000 lbs. and its interior must be coated through a small opening at each end of the flask. With the present solution the flask may be rotated and coated on its interior with a spray gun. In carrying out the process the flask is revolved from 20 to 40 R. P. M.'s and the spray gun moved through the opening at one end. After the entire interior surface has been covered, the gun is removed and the flask transferred to an oven where it is also revolved while being baked. The present solvent permits the application of a coating as thick as from 0.0015 to 0.0025 inch after drying, and the coatings are free from runs, sags and blisters.

In carrying out the process the interior of the flask is acid etched, preferably by the process disclosed in our co-pending application 483,658, filed April 19, 1943. For example, the flask is degreased in a solvent degreaser or by dipping in a 5% sodium hydroxide solution at 165° F.; is then rinsed with water; is then given a 15-minute dip in 25% by weight sulfuric acid at 165° F.; rinsed with water; given a momentary dip in 1% potassium dichromate to which has been added 2% sodium carbonate; is then rinsed and dried.

The resinous coating is then applied. The coating should have a viscosity between 18 and 40 seconds as determined by a Ford viscosity cup No. 4 test. The solvent itself has the following characteristics:

| | Per cent |
|---|---|
| Solvent having a boiling range from 180°–250° C | 2–10 |
| Solvent having a boiling range from 90°–130° C | 34–44 |
| Solvent having a boiling range from 65°–90° C | 57–67 |

A preferred solvent is as follows:

| | Parts |
|---|---|
| Steamed-distilled pine oil | 18 |
| Ethyl alcohol | 50 |
| Butyl alcohol | 32 |

Sufficient of this solvent mixture is employed with the phenol formaldehyde resin to give the viscosity of 18 to 40 seconds as described.

After mixing the resin it is sprayed on the flask, as hereinbefore described, and the coating heated to dry it and then baked from 15 to 60 minutes at 150° C., the time depending upon the thickness of the metal. Care, however, is taken, where more than one coat is to be employed, not to completely set the coating. Another coat is then applied in the same manner as before, and, after drying, it is baked for about one hour at 200° C.

A two-coat film so applied will have a thickness of 0.003 to 0.005 inch. In general a finish of clear resin is not required on this type of work but it may be added where desired.

The foregoing detailed description has been given for clearness of understanding only, and no unnecessary limitations should be understood therefrom.

What we claim as new, and desire to secure by Letters Patent, is:

1. A resinous coating composition comprising an oil-free polymerizable phenol formaldehyde resin substantially completely dissolved in a solvent consisting of:

| | Parts |
|---|---|
| Steam-distilled pine oil | 18 |
| Ethyl alcohol | 50 |
| Butyl alcohol | 32 | the proportion of resin to solvent being such to produce a composition having a viscosity between 18 to 40 seconds as determined by Ford viscosity cup No. 4.

2. A resinous coating composition comprising an oil-free polymerizable phenol formaldehyde resin, 10% to 45% by weight of the resin of an inert filler, and a solvent consisting of 18 parts of steam-distilled pine oil, 50 parts of ethyl alcohol and 32 parts of butyl alcohol, said resin being substantially completely dissolved in said solvent and the resulting composition having a viscosity of between 18 and 40 seconds as determined by Ford viscosity cup No. 4.

CHARLES H. HEMPEL.
FRANCIS J. PLOEDERL.

REFERENCES CITED

The following references are of record in the file of this patent:

UNITED STATES PATENTS

| Number | Name | Date |
|---|---|---|
| 2,253,235 | Hempel | Aug. 19, 1941 |
| 1,939,521 | Reichenbacher et al. | Dec. 12, 1933 |
| 2,207,432 | Fulton et al. | July 9, 1940 |
| 2,294,711 | Bjorksten | Sept. 1, 1942 |